US009384059B2

(12) United States Patent
Yamamoto et al.

(10) Patent No.: US 9,384,059 B2
(45) Date of Patent: Jul. 5, 2016

(54) COMPARING RESOURCE COSTS BETWEEN ALLOCATION PLANS IN A LOAD BALANCE APPARATUS

(71) Applicant: HITACHI, LTD., Tokyo (JP)

(72) Inventors: Hideyuki Yamamoto, Tokyo (JP); Xianchun Xu, Tokyo (JP); Toru Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 14/239,927

(22) PCT Filed: May 31, 2013

(86) PCT No.: PCT/JP2013/065171
§ 371 (c)(1),
(2) Date: Feb. 20, 2014

(87) PCT Pub. No.: WO2014/192132
PCT Pub. Date: Dec. 4, 2014

(65) Prior Publication Data
US 2016/0070601 A1     Mar. 10, 2016

(51) Int. Cl.
*G06F 9/50*     (2006.01)
*G06F 9/46*     (2006.01)

(52) U.S. Cl.
CPC .................................. *G06F 9/5077* (2013.01)

(58) Field of Classification Search
None
See application file for complete search history.

(56) References Cited

U.S. PATENT DOCUMENTS

| | | | |
|---|---|---|---|
| 2011/0231843 A1 | 9/2011 | Shimogawa | |
| 2012/0066684 A1 | 3/2012 | Takami | |
| 2013/0254403 A1* | 9/2013 | Taniguchi | H04L 47/783 709/226 |
| 2013/0339956 A1* | 12/2013 | Murase | G06F 9/505 718/1 |
| 2014/0181804 A1* | 6/2014 | Sakata | G06F 9/455 718/1 |

FOREIGN PATENT DOCUMENTS

| | | |
|---|---|---|
| JP | 2005-031892 A | 2/2005 |
| JP | 2008-269250 A | 11/2008 |
| JP | 2011-118525 A | 6/2011 |
| JP | 2011-197852 A | 10/2011 |

(Continued)

OTHER PUBLICATIONS

Campegiani, "A Genetic Algorithm to Solve the Virtual Machines Resources Allocation Problem in Multi-tier Distributed Systems", pp. 1-9, 2009.

(Continued)

*Primary Examiner* — Eric C Wai
(74) *Attorney, Agent, or Firm* — Mattingly & Malur, PC

(57) ABSTRACT

An apparatus predicts time-series variations in resource usage for logical structures for a future time period (a schedule period) on the basis of a history representing the history of resource usage by the logical structures. The apparatus attempts to select a plurality of arrangement candidates for which resource usage in each of a plurality of physical machines is equal to or less than a criterion for each of a plurality of time segments comprising the schedule period. The apparatus computes a migration cost of migrating the logical structures between physical machines for an arrangement according to a holistic arrangement plan for each of a plurality of holistic arrangement plans. Each of the plurality of holistic arrangement plans is a combination of a plurality of selected arrangement candidates corresponding to each of the plurality of time segments.

1 Claim, 17 Drawing Sheets

(56) References Cited

FOREIGN PATENT DOCUMENTS

| WO | 2010/140183 A1 | 12/2010 |
| WO | 2011-039740 A | 2/2011 |

OTHER PUBLICATIONS

International Searching Authority, Written Opinion received in PCT/JP2013/065171, Jun. 25, 2013.

* cited by examiner

Fig. 3

| PM identifier | Operating status | CPU configuration (number of cores) | Memory configuration (MB) | CPU current usage (%) | CPU usage data reference-destination address | CPU threshold (%) | RAM current usage (%) | RAM usage data reference-destination address | RAM threshold (%) |
|---|---|---|---|---|---|---|---|---|---|
| 141a | 141b | 141c | 141d | 141e | 141f | 141g | 141h | 141i | 141j |
| PM001 | T | 8 | 8192 | 67 | 0042FF80 | 80 | 66 | 0061FF80 | 80 |
| PM002 | T | 4 | 4096 | 55 | 0042FF84 | 60 | 57 | 0061FF84 | 80 |
| PM003 | T | 16 | 16384 | 42 | 0042FF88 | 80 | 73 | 0061FF88 | 70 |
| .. | .. | | | | .. | | | .. | .. |

| VM identifier 142a | Operating status 142b | CPU current usage (number of cores) 142c | CPU usage data reference-destination address 142d | RAM current usage (MB) 142e | RAM usage data reference-destination address 142f | Operation-destination PM identifier 142g |
|---|---|---|---|---|---|---|
| VM001 | T | 1.7 | 0012FF80 | 1960 | 0031FF80 | PM003 |
| VM002 | F | 0 | 0012FF84 | 0 | 0031FF84 | PM001 |
| VM003 | T | 2.2 | 0012FF88 | 4136 | 0031FF88 | PM003 |
| VM004 | T | 2.6 | 0012FF92 | 6396 | 0031FF92 | PM002 |
| .. | .. | .. | .. | .. | .. | |

Fig. 5

| Time point 143a | CPU usage (%) 143b | RAM usage (%) 143c |
|---|---|---|
| 2013/1/1 12:30:00 | 67 | 62 |
| 2013/1/1 12:30:30 | 41 | 64 |
| 2013/1/1 12:31:00 (Current time point) | 61 | 64 |
| 2013/1/1 12:31:30 | 52 | 62 |
| 2013/1/1 12:32:00 | 69 | 68 |
| 2013/1/1 12:32:30 | 60 | 56 |
| .. | .. | .. |

| Time point | CPU usage (number of cores) | RAM usage (MB) |
|---|---|---|
| 2013/1/1 12:30:00 | 1.7 | 2870 |
| 2013/1/1 12:30:30 | 1.1 | 2642 |
| 2013/1/1 12:31:00 (Current time point) | 1.8 | 2684 |
| 2013/1/1 12:31:30 | 2.6 | 2684 |
| 2013/1/1 12:32:00 | 1.4 | 2220 |
| 2013/1/1 12:32:30 | 1.3 | 2282 |
| .. | .. | .. |

Fig. 7

| Time-segment identification number 145a | Candidate VM arrangement number 145b | Resource cost 145c | VM arrangement pattern 145d |
|---|---|---|---|
| 000 | 000 | 1028740 | PM1={VM3,VM8,VM9}<br>PM2={VM1,VM4,VM6}<br>PM3={VM2,VM5,VM11}<br>.. |
| 000 | 001 | 1849051 | PM1={VM12,VM6,VM9}<br>PM2={VM10,VM4,VM7}<br>PM3={VM2,VM5,VM13}<br>.. |
| 000 | .. | .. | .. |
| 000 | 099 | 5122980 | PM1={VM2,VM4,VM9}<br>PM2={VM7,VM8,VM12}<br>PM3={VM1,VM5,VM13}<br>.. |
| 001 | 000 | 2304932 | PM1={VM9,VM12,VM19}<br>PM2={VM2,VM4,VM8}<br>PM3={VM1,VM5,VM6}<br>.. |
| 001 | 001 | -1 | NULL |
| 001 | 002 | 2749109 | PM1={VM5,VM8,VM14}<br>PM2={VM6,VM7,VM10}<br>PM3={VM3,VM5,VM11}<br>.. |
| .. | .. | .. | .. |

| Time-segment identification number | Start time point | End time point | Adopted VM arrangement number | Migration cost |
|---|---|---|---|---|
| 000 | 2013/1/1 06:00 | 2013/1/1 18:00 | 012 | 132 |
| 001 | 2013/1/1 18:00 | 2013/1/2 06:00 | 056 | 121 |
| 002 | 2013/1/2 06:00 | 2013/1/2 18:00 | 003 | 219 |
| 003 | 2013/1/2 18:00 | 2013/1/3 06:00 | -1 | -1 |
| .. | .. | .. | .. | |

Fig. 9

| Time-segment identification number (147a) | Threshold-overrun VM identifier (147b) |
|---|---|
| 003 | VM3,VM8,VM9,VM11,VM14 |
| 019 | VM5,VM8,VM12,VM13,VM19,VM23 |
| 033 | VM10,VM18 |
| .. | .. |

147

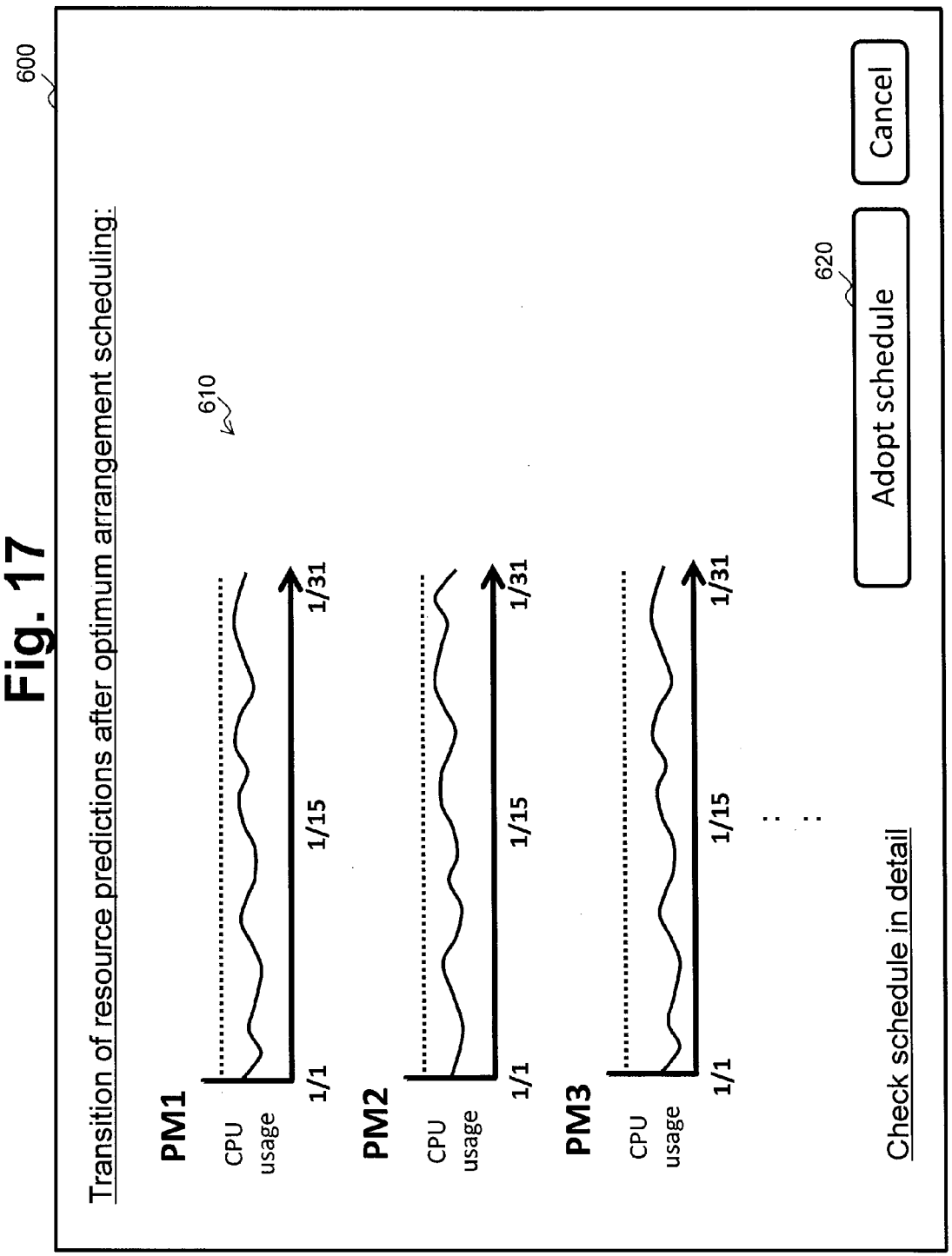

COMPARING RESOURCE COSTS BETWEEN ALLOCATION PLANS IN A LOAD BALANCE APPARATUS

TECHNICAL FIELD

The present invention relates to controlling the arrangement of a plurality of logical structures that uses the resources of a plurality of physical machines.

BACKGROUND ART

Computer systems that build virtual machines (VM) that use the resources of physical machines (PM) and carry out business processing using the VMs are known. An example of a PM is a physical computer, and an example of a VM is a virtual computer.

A VM load balance technique using a genetic algorithm is disclosed in Patent Literature 1 as a technique related to this kind of computer system. Specifically, in the technique of Patent Literature 1, a resource threshold is provided in the PM. The resource threshold is the usage threshold for a resource (for example, a CPU or memory). When PM resource usage exceeds the resource threshold during VM operation, a VM arrangement is computed such that the PM resource usage becomes equal to or less than the resource threshold, and VM migration is performed in order to realize the computed VM arrangement. This makes it possible to avoid the occurrence of a PM performance failure during VM operation.

CITATION LIST

Patent Literature

[PTL 1]
Japanese Laid-open Patent Application No. 2008-269250

SUMMARY OF INVENTION

Technical Problem

However, the following problems exist in the technique described in Patent Literature 1.

(Problem 1) Load balance in Patent Literature 1 is performed when resource usage exceeds the resource threshold. That is, resource usage exceeds the resource threshold for a moment. Therefore, there is the possibility of a performance failure occurring temporarily in the PM.

(Problem 2) In order to realize the load balance of Patent Literature 1, the VMs must be migrated among the PMs. A temporary VM stoppage occurs in line with this VM migration (a temporary stoppage of the VM occurs even with a so-called live migration). In addition, the VM register and active memory information must be transferred to the migration-destination PM, and the transfer puts a load on the network bandwidth. These phenomena can constitute a risk to VM operation. The cost, which includes VM stoppage and network bandwidth load due to VM migration, will be called "VM migration cost" herein. The VM migration cost is not considered at all in the technique of Patent Literature 1.

Solution to the Problem

A load balance apparatus is built for controlling the arrangement of a plurality of logical structures that use the resources of a plurality of physical machines. The load balance apparatus predicts, on the basis of historical data representing the history of resource usage by the logical structures, time-series variations in resource usage for each logical structure targeted for arrangement control for a schedule period, which is a period of time in the future. The apparatus attempts to select a plurality of arrangement candidates for which resource usage is equal to or less than a criterion value for each of a plurality of physical machines for each of a plurality of time segments comprising the schedule period (the criterion value for one physical machine is the resource usage threshold of the physical machine). The apparatus computes, for each of a plurality of holistic arrangement plans, the migration cost of migrating the logical structures among the physical machines for arrangement according to a holistic arrangement plan. Each of the plurality of holistic arrangement plans is a combination of a plurality of selected arrangement candidates corresponding to each of a plurality of time segments. A selected arrangement candidate for a single time segment is one arrangement candidate from among the plurality of arrangement candidates corresponding to the time segment. The load balance apparatus selects one holistic arrangement plan from the plurality of holistic arrangement plans based on the migration cost of each of the plurality of holistic arrangement plans.

Advantageous Effects of Invention

The present invention makes it possible to realize the arrangement of logical structures in which physical machine resource usage can be held down to equal to or less than a criterion value, and migration costs can be curbed.

BRIEF DESCRIPTION OF DRAWINGS

FIG. 3 is a block diagram of a physical machine management table related to the embodiment.

FIG. 4 is a block diagram of a virtual machine management table related to the embodiment.

FIG. 5 is a block diagram of a physical machine resource usage management table related to the embodiment.

FIG. 6 is a block diagram of a virtual machine resource usage management table related to the embodiment.

FIG. 7 is a block diagram of a candidate VM arrangement management table related to the embodiment.

FIG. 8 is a block diagram of an arrangement schedule management table related to the embodiment.

FIG. 9 is a block diagram of a threshold-overrun VM management table related to the embodiment.

FIG. 17 is a block diagram of a post-optimum arrangement scheduling resource prediction display screen related to the embodiment.

DESCRIPTION OF EMBODIMENTS

Figure 1:
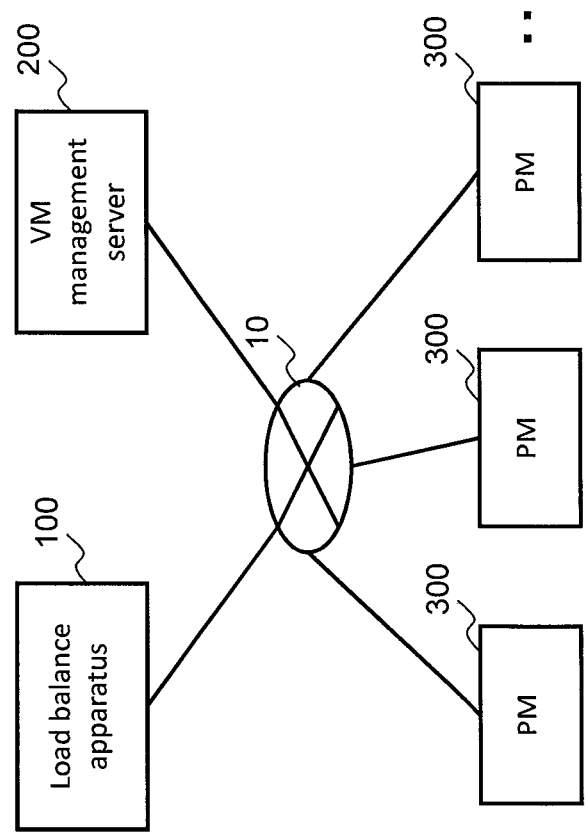
FIG. 1 is a block diagram of a computer system related to an embodiment.

The embodiment will be explained by referring to the drawings.

Furthermore, in the following explanation, there may be cases where information is explained using expressions such as "aaa table", but this information may also be expressed using a data structure other than a table. Therefore, to show that this information is not dependent on the data structure, "aaa table" and so forth may be called "aaa information". In addition, in the following explanation, identification information is either an "identifier" or a "number", but other types of identification information may be used.

In the following explanation, there may be cases where "program" is the subject of a sentence used to describe a process, but since the stipulated processing is performed in accordance with a program being executed by a processor (for example, a Central Processing Unit (CPU)) while using a storage resource (for example, a memory) and/or a communication interface apparatus (for example, a port) as needed, the subject of the processing may also be the processor. A process, which is described having a program as the subject, may be regarded as a process performed by a processor or other such apparatus. The processor may include a hardware circuit for performing either all or a portion of the processing. A computer program may be installed in the apparatus from a program source. The program source, for example, may be a program delivery server or a computer readable storage media.

The load balance apparatus has input/output devices. A display, a keyboard, and a pointer device can be given as examples of input/output devices, but the input/output device may be another type of device. As an alternative to an input/output device, a serial interface and/or an Ethernet interface may be used as the input/output device, a computer for display use having a display, a keyboard, or a pointer device may be connected to the relevant interface, and by sending display information to the computer for display use and receiving input information from the computer for display use, the relevant interface may substitute for the input and display of an input/output device by carrying out a display on and receiving information from the computer for display use. The load balance apparatus may be realized using either one or a plurality of computers. The act of "displaying" on the part of the load balance apparatus (or the processor of the load balance apparatus) may involve either the load balance apparatus displaying information on the display device of the apparatus, or sending the information to be displayed on the display device to another computer (a computer for display use) that has a display device. A combination of the load balance apparatus and the computer for display use can be called a load balance system.

FIG. 1 is a block diagram of a computer system related to the embodiment.

The computer system has a load balance apparatus 100, a virtual machine (VM) management server 200, and a physical machine (PM) 300. The load balance apparatus 100, the VM management server 200, and the PM 300 are connected via a communication network 10.

A VM (an example of a logical structure) that operates by using the resources (physical resources) of the PM 300 can be built on the PM 300. The PM 300 has a virtualization mechanism (typically, a hypervisor) (not shown in the drawing) capable of building a VM, migrating a VM, and so forth.

The VM management server 200 manages a plurality of VMs on a PM 300. Specifically, for example, the VM management server 200 either sends instructions for building (creating) a VM, or instructions for migrating a VM to the PM 300. A VM migration instruction, for example, is sent to the virtualization mechanism of the migration-source PM, and may include the identifier of the migration-target VM and the identifier of the migration-destination PM.

The load balance apparatus 100 distributes the load of a plurality of PMs 300 by controlling the arrangement of the VMs in the PMs 300. The load balance apparatus 100 may have the functions of the VM management server 200, hence the VM management server 200 may not be necessary.

A summary of the processing performed by the load balance apparatus 100 will be explained here.

(1) The load balance apparatus 100 calculates time-series prediction values for VM resource usage for each VM. The "VM resource usage of a VM" is the amount of resources used by the VM. The resources used by the VM are resources of the PM on which this VM is being executed. The "VM resource usage time-series prediction values of a VM" is a series of values predicting VM resource usage at each of a plurality of time points in the future. The load balance apparatus 100 uses the VM resource usage time-series prediction values for each VM to decide on a VM arrangement schedule. The VM arrangement schedule represents, for each of a plurality of VMs, the relationship between the VM, the arrangement destination of the VM (typically, a PM), and a time point at which the VM is to be disposed in the arrangement destination. According to the VM arrangement schedule, the total VM resource usage of one or more VMs disposed in the same PM is equal to or less than the resource threshold of the PM at each of a plurality of time points in the future. Therefore, the expectation is that the resource threshold will not be exceeded in any of the PMs even when the respective VM arrangement destinations change in accordance with the VM arrangement schedule.

(2) A candidate VM arrangement (a combination of a plurality of VM arrangements) that makes it possible to avoid exceeding the resource threshold may exist as a plurality for at least one time point in the future. The load balance apparatus 100 retrieves a plurality of candidate VM arrangements, and selects a candidate VM arrangement having the smallest VM migration cost of the plurality of candidate VM arrangements. The VM arrangement schedule is the schedule that corresponds to the selected candidate VM arrangement.

(3) The VM arrangement schedule is calculated using a multi-stage optimization process, for example, a two-stage optimization process. Retrieval samples other than the significant retrieval sample (VM arrangement combination) are rejected, thereby making it possible to efficiently calculate the VM arrangement schedule.

The summary of the processing performed by the load balance apparatus 100 will be explained in more detail.

First, the load balance apparatus 100 creates VM resource usage prediction data on the basis of VM resource usage history data. VM resource usage history data represents the history of VM resource usage for each VM. The VM resource usage history of a VM is the VM resource usage at each of a plurality of times (time points) in the past for the VM. VM resource usage prediction data represents time-series prediction values of VM resource usage for each VM (the series of VM resource usage prediction values at a plurality of time points in the future).

Next, the load balance apparatus 100 divides a schedule period (the target period of the VM arrangement schedule) into a plurality of segments. The plurality of segments is each the same length, and the length of at least one segment may be different from those of the other segments. The divided segments will be referred to as "time segments" below.

Thereafter, the load balance apparatus 100 executes the two-stage optimization process.

In the first stage of the optimization process, the load balance apparatus 100 retrieves for each time segment a candidate VM arrangement via which the VM resource usage will be equal to or less than the resource threshold for each PM 300. The load balance apparatus 100 can repeat retrieval so as to enable the acquisition of a plurality of candidate VM arrangements for each time segment. One or more candidate VM arrangements for a single time segment may be referred to below as a "candidate VM arrangement group". In the first stage of the optimization process, the retrieval of the candidate VM arrangement can make use of an algorithm that is effective at optimizing the knapsack problem, for example, any of the Markov chain Monte Carlo method, simulated annealing, the replica-exchange method, a genetic algorithm, and the branch-and-bound method.

In the second stage of the optimization process, the load balance apparatus 100 selects for each time segment one candidate VM arrangement (VM arrangement to be adopted) from among a time-segment candidate VM arrangement group. The one candidate VM arrangement selected in the second stage of the optimization process for each time segment is referred to as the "selected VM arrangement" below. One candidate VM arrangement is selected here for each time segment so that the VM migration cost is minimized for the entire schedule period. Since the VM migration cost can be minimized (can be optimized) for the entire schedule period, a candidate VM arrangement that does not minimize the VM migration cost for any of the time segments could be selected. An aggregate of a plurality of selected VM arrangements corresponding to each of a plurality of time segments is the VM arrangement schedule related to the embodiment. Since the criterion for selecting one candidate VM arrangement for each time segment is the single criterion of the VM migration cost, an algorithm that is effective for the one-dimensional spin system model optimization problem, for example, any of the Markov chain Monte Carlo method, simulated annealing, the replica-exchange method, and the branch-and-bound method, can be used here as the algorithm for deciding the VM arrangement schedule.

As explained above, the load balance apparatus 100, in accordance with the first stage optimization process, retrieves a candidate VM arrangement group taking into account VM resource usage for each time segment in the schedule period, and in accordance with the second stage optimization process, determines a selected VM arrangement for each time segment taking into account VM migration costs. This makes it possible to decide on an optimum VM arrangement schedule that takes into account both VM resource usage and VM migration costs.

The load balance apparatus 100 will be explained in detail below.

Figure 2:
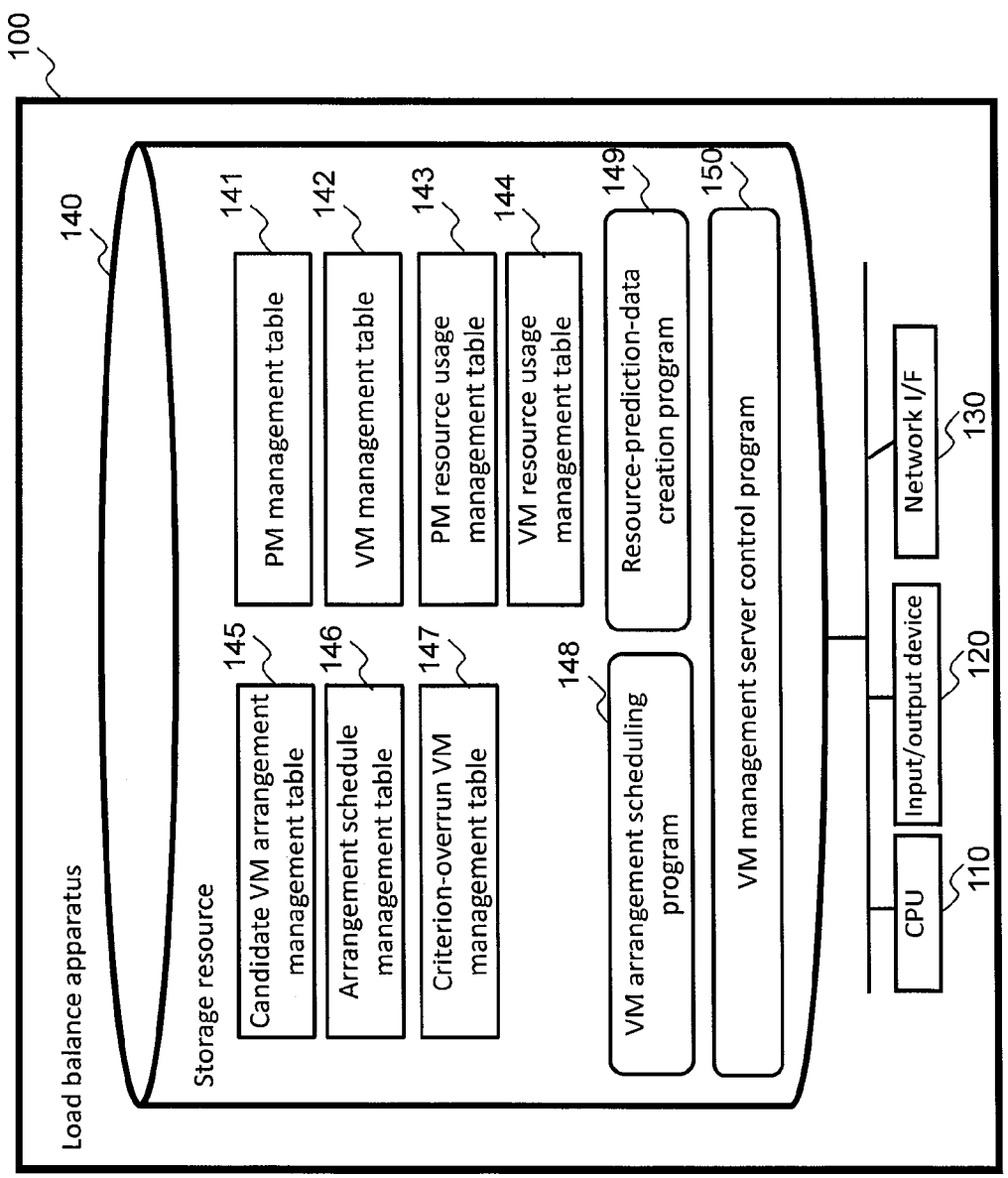
FIG. 2 is a block diagram of a load balance apparatus related to the embodiment.

FIG. 2 is a block diagram of the load balance apparatus 100.

The load balance apparatus 100 has an input/output device 120, a network I/F 130, a storage resource 140, and a Central Processing Unit (CPU) 110 that is connected to these components. The CPU 110, the input/output device 120, the network I/F 130 and the storage resource 140 are communicably connected via an internal bus.

The CPU 110 executes various processing by executing programs stored in the storage resource 140. The input/output device 120 includes a mouse, keyboard, or other such input device for receiving an input from a user, and a display or other such output device for outputting information to the user. The network I/F 130 is an interface device for connecting the load balance apparatus 100 to the network 10.

The storage resource 140 may be a RAM or other such semiconductor storage apparatus, an HDD or other such secondary storage apparatus, or a combination of a semiconductor storage apparatus and a secondary storage apparatus. The storage resource 140 stores various information and various types of programs. In the embodiment, the storage resource 140 stores a PM management table 141, a VM management table 142, a PM resource usage management table 143, a VM resource usage management table 144, a candidate VM arrangement management table 145, an arrangement schedule management table 146, a threshold-overrun VM management table 147, a VM arrangement scheduling program 148, a resource-prediction-data creation program 149, and a VM management server control program 150. The tables 141 through 147 will each be explained in detail further below. The VM arrangement scheduling program 148 executes processing for scheduling the arrangement of VMs in the PM 300. The resource-prediction-data creation program 149 creates prediction data for resource usage that a management-target VM could require in the future. The VM management server control program 150 controls the VM management server 200 so as to allow the VM arrangement scheduling program 148 to arrange the VMs scheduled for arrangement.

FIG. 3 is a block diagram of the PM management table.

The PM management table 141 is for managing the consumption status (usage) of the resources of the PM. For each PM, the PM management table 141 has entries comprising the fields of a PM identifier 141$a$, an operating status 141$b$, a CPU configuration 141$c$, a memory configuration 141$d$, a CPU current usage 141$e$, a CPU usage data reference-destination address 141$f$, a CPU threshold 141$g$, a RAM current usage 141$h$, a RAM usage data reference-destination address 141$i$, and a RAM threshold 141$j$. That is, in the embodiment, the CPU and the Random Access Memory (RAM) are managed as resources of the PM 300. However, another type of resource may be managed either in place of or in addition to at least one of the CPU or the RAM.

An identifier (PM identifier) for identifying a PM 300 is stored in the PM identifier 141$a$. The operating status of the PM 300 is stored in the operating status 141$b$. As the operating status, there is "T" indicating the resource is in operation, and there is "F" indicating the resource is not in operation. The number of CPU cores in the PM 300 is stored in the CPU configuration 141$c$. The capacity of the memory in the PM 300 is stored in the memory configuration 141$d$. The current (recently measured) utilization rate (usage) of the CPU is stored in the CPU current usage 141$e$. The address of the region (reference destination in the PM resource usage management table 143), in which is stored the CPU usage value data (usage data), is stored in the CPU usage data reference-destination address 141$f$. A threshold (a criterion value) for the CPU usage value is stored in the CPU threshold 141$g$. The current (recently measured) percentage of RAM in use (usage) relative to RAM capacity is stored in the RAM current usage 141$h$. The address of the region (reference destination in the PM resource usage management table 143), in which is stored the RAM usage value data (usage data), is stored in the RAM usage data reference-destination address 141$i$. A threshold (a criterion value) for the RAM usage value is stored in the RAM threshold 141$j$.

FIG. 4 is a block diagram of the VM management table 142.

The VM management table 142 is for managing the state of resource use by the VM. For each VM, the VM management table 142 has entries comprising the fields of VM identifier 142a, operating status 142b, CPU current usage 142c, CPU usage data reference-destination address 142d, RAM current usage 142e, RAM usage data reference-destination address 142f, and operation-destination PM identifier 142g.

An identifier (VM identifier) for identifying a VM is stored in the VM identifier 142a. The operating status of the VM is stored in the operating status 142b. As the operating status, there is "T" indicating the resource is in operation, and there is "F" indicating the resource is not in operation. The current (recently measured) number of cores in use (number of CPU cores being used) by the VM is stored in the CPU current usage 142c. The address of the region (reference destination in the VM resource usage management table 144), in which is stored the CPU usage (number of CPU cores) data, is stored in the CPU usage data reference-destination address 142d. The current (recently measured) RAM usage (amount of used value) by the VM is stored in the RAM current usage 142e. The address of the region (reference destination in the VM resource usage management table 144), in which is stored the RAM usage data, is stored in the RAM usage data reference-destination address 142f. The PM identifier of the PM 300 on which the VM is operating is stored in the operation-destination PM identifier 142g.

FIG. 5 is a block diagram of the PM resource usage management table 143.

A PM resource usage management table 143 is stored in the storage resource 140 for each PM. The PM resource usage management table 143 is for managing the history of the PM resource usage. The PM resource usage management table 143 has entries comprising the fields of a time point 143a, a CPU usage value 143b, and a RAM usage value 143c.

A time point is stored in the time point 143a. The CPU usage value (percentage of CPU usage) at the time point stored in the time point 143a is stored in the CPU usage value 143b. The RAM usage value (percentage of RAM capacity used) at the time point of the time point 143a is stored in the RAM usage value 143c.

FIG. 6 is a block diagram of the VM resource usage management table 144.

A VM resource usage management table 144 is stored in the storage resource 140 for each VM. The VM resource usage management table 144 is for managing the history of the usage value of the resources used by the VM. The VM resource usage management table 144 has entries comprising the fields of a time point 144a, a CPU usage value 144b, and a RAM usage value 144c.

A time point is stored in the time point 144a. The CPU usage value for the VM (number of CPU cores in use) at the time point stored in the time point 144a is stored in the CPU usage value 144b. The RAM usage value for the VM (RAM capacity used) at the time point stored in the time point 144a is stored in the RAM usage value 144c.

FIG. 7 is a block diagram of the candidate VM arrangement management table 145.

The candidate VM arrangement management table 145 is for managing information related to candidate VM arrangements. For each candidate VM arrangement, the candidate VM arrangement management table 145 has entries comprising the fields of a time-segment identification number 145a, a candidate VM arrangement number 145b, a resource cost 145c, and a VM arrangement pattern 145d.

An identification number (time-segment identification number) for identifying a time segment in the schedule period is stored in the time-segment identification number 145a. A number (candidate VM arrangement number) for identifying candidate VM arrangements in the same time segment is stored in the candidate VM arrangement number 145b. A resource cost for a candidate VM arrangement is stored in the resource cost 145c. The resource cost will be explained further below. A pattern (arrangement pattern) showing the arrangement of VMs in PMs 300 of the computer system is stored in the VM arrangement pattern 145d. For example, in the topmost entry in the candidate VM arrangement management table 145, for the candidate VM arrangement having candidate VM arrangement number "000" in the time-segment identification number "000", the resource cost is "1028740", VMs "VM3", "VM8" and "VM9" are arranged in the PM "PM1", VMs "VM1", "VM4" and "VM6" are arranged in the PM "PM2", and VMs "VM2", "VM5" and "VM11" are arranged in the PM "PM3".

FIG. 8 is a block diagram of the arrangement schedule management table 146.

The arrangement schedule management table 146 is for managing a VM arrangement schedule showing the relationship between a time segment and a VM arrangement. The arrangement schedule management table 146 has entries comprising the fields of a time-segment identification number 146a, a start time point 146b, an end time point 146c, an adopted VM arrangement number 146d, and a migration cost 146e.

An identification number for a time segment in the schedule period is stored in the time-segment identification number 146a. The start time point of the time segment corresponding to the time-segment identification number in the time-segment identification number 146a of the entry is stored in the start time point 146b. The end time point of the time segment corresponding to the time-segment identification number in the time-segment identification number 146a of the entry is stored in the end time point 146c. A number (candidate VM arrangement number) of the candidate VM arrangement selected for adoption in the time segment corresponding to the time-segment identification number in the time-segment identification number 146a of the entry is stored in the adopted VM arrangement number 146d. The VM migration cost for the candidate VM arrangement corresponding to the candidate VM arrangement number in the adopted VM arrangement number 146c is stored in the migration cost 146e. The VM migration cost will be explained further below.

FIG. 9 is a block diagram of the threshold-overrun VM management table 147.

The threshold-overrun VM management table 147 is for managing an aggregate of VMs (threshold-overrun VMs) that are causing threshold overrun in a time segment during which physical resource usage exceeds a threshold, and has entries comprising the fields of a time-segment identification number 147a and a threshold-overrun VM identifier 147b.

The identification number of the time segment for which physical resource usage exceeds a threshold is stored in the time-segment identification number 147a. The identifier(s) of one or more VMs, which are operating in the time segment corresponding to the time-segment identification number in the time-segment identification number 147a of the entry and are causing threshold overrun, is/are stored in the start time point 147b.

Next, the processing performed in the embodiment will be explained. In the following explanations of the flowcharts, a value that is substituted for a variable is updated in accordance with an increment, but an update other than an increment (for example, a decrement) may also be employed.

Figure 10:
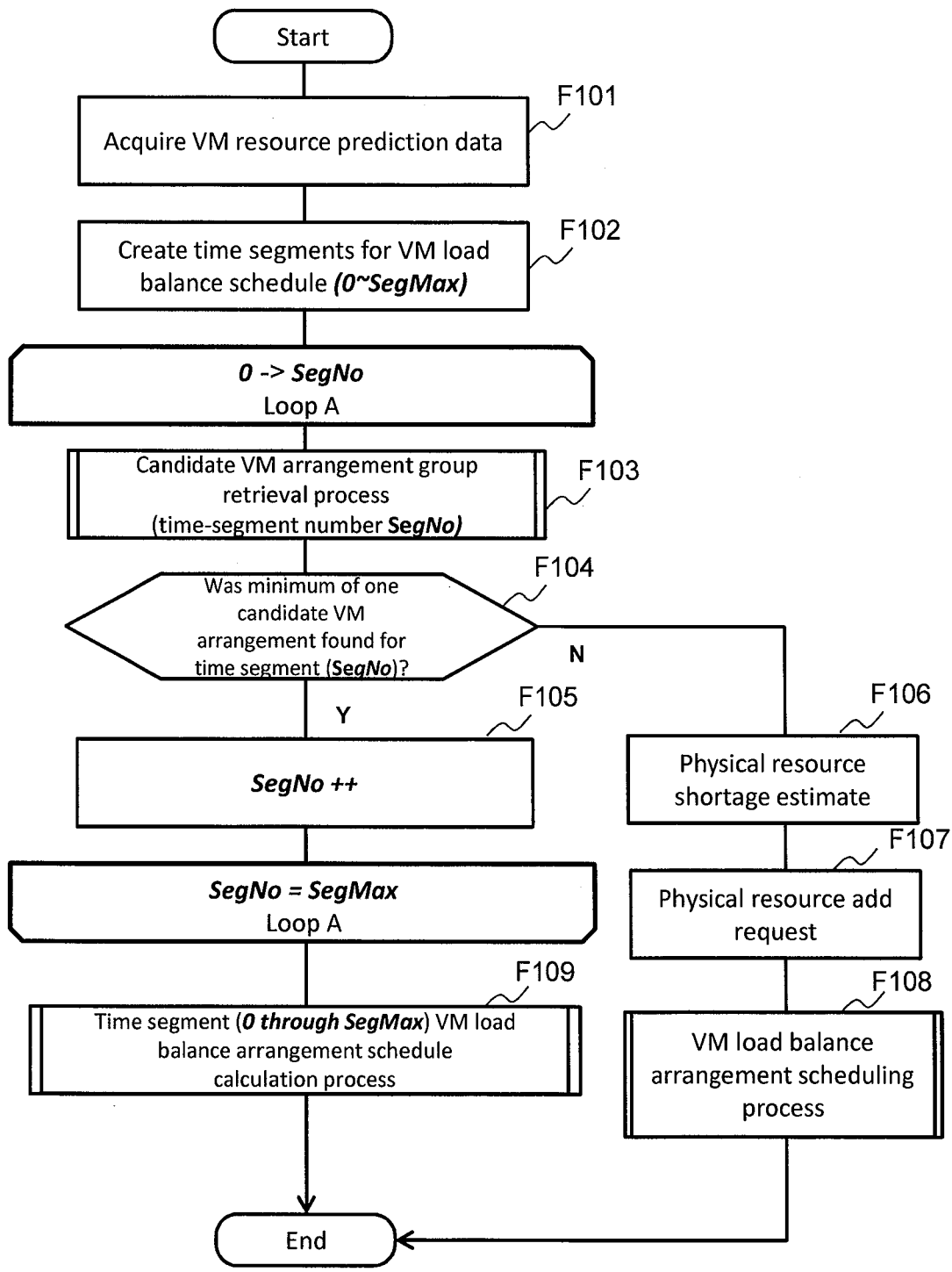
FIG. 10 is a flowchart of processing for scheduling a VM load balance arrangement related to the embodiment.

FIG. 10 is a flowchart of the processing for scheduling a VM load balance arrangement.

The VM load-distribution arrangement scheduling process, for example, is executed when the load balance apparatus 100 receives an instruction for optimum arrangement scheduling from the user via the input/output device 120.

The resource-prediction-data creation program 149 acquires historical data on the resource usage of each VM (resource usage history data) from the VM management server 200, and on the basis of the resource usage history data, acquires (creates) resource prediction data that predicts the usage of resources in the future by each VM, and stores the resource prediction data in the VM resource usage management table 144 (Step F101). As used here, resource prediction data is time-series data obtained by performing a known statistical process with respect to the resource usage history data, and any kind of data is acceptable as long as the data predicts future resource usage. For example, data that predicts resource usage (for example, RAM usage) from Jan. 1, 2013 to Jan. 5, 2013 may be obtained by multiplying the actual resource usage during the same period of the previous year (from Jan. 1, 2012 to Jan. 5, 2012) by a prescribed annual growth rate.

In addition, in Step F101, the resource-prediction-data creation program 149 calculates the resource usage of the PM 300 operating the respective VMs on the basis of the contents of each VM resource usage management table 144, and stores the calculated resource usage in the PM resource usage management table 143.

Next, the VM arrangement scheduling program 148 creates a plurality of time segments from a schedule period by dividing a VM arrangement scheduling-target period (the schedule period), which has been specified by the administrator via the input/output device 120, into prescribed units of time (Step F102). At this point, the VM arrangement scheduling program 148 defines each time segment so as to be identifiable using the identification numbers 1, 2, 3, . . . SegMax. The VM arrangement scheduling program 148 registers the time segment information (time-segment identification numbers, start time points, end time points, etc.) in the candidate VM arrangement management table 145 and the arrangement schedule management table 146.

Next, the VM arrangement scheduling program 148 executes the loop A first-stage optimization process (Steps F103 through F105) targeted at each time segment. A time segment targeted for processing in Loop A will be referred to herein as a target time segment. A 0 is configured in the SegNo variable at the time point at which Loop A started. The SegNo variable indicates the time-segment number of the target time segment.

Specifically, the VM arrangement scheduling program 148 executes candidate VM arrangement group retrieval processing (refer to FIG. 11) with respect to the target time segment (Step F103). The argument in the candidate VM arrangement group retrieval process here constitutes the target time segment number (SegNo). In the candidate VM arrangement group retrieval process, an attempt is made to retrieve an aggregate (candidate VM arrangement group) of optimum VM arrangement candidates (candidate VM arrangements) in the target time segment. The retrieved candidate VM arrangement group is stored in the candidate VM arrangement management table 145.

Next, the VM arrangement scheduling program 148 determines whether or not a minimum of one candidate VM arrangement has been found for the target time segment (SegNo) (Step F104). When the result is that a minimum of one candidate VM arrangement has been found for the target time segment (SegNo) (Step F104: Y), the VM arrangement scheduling program 148 increments the SegNo variable (Step F105), and executes the processing for the next time segment.

Alternatively, a case in which not even one candidate VM arrangement has been found for the target time segment (SegNo) (Step F104: N) signifies that resource optimization has failed, and as such, the VM arrangement scheduling program 148 estimates the amount of physical resources that are lacking (Step F106). Specifically, the VM arrangement scheduling program 148 refers to the threshold-overrun VM management table 147, identifies the amount of physical resources required to operate the VM of each identifier in the threshold-overrun VM identifier 147b, and estimates the physical resource quantity shortage by adding up the amount of physical resources.

Next, the VM arrangement scheduling program 148 notifies the user the time point at which the PM 300 resource shortage will occur, and the amount of PM 300 resources that must be added for resource optimization (Step F107). The time point at which the resource shortage will occur here is the start time point of the time segment in the arrangement schedule management table 146 for which resource optimization failed. The amount of resources that must be added for resource optimization is the physical resource quantity shortage estimated in Step F106. This makes it possible to appropriately notify the user of the time point at which a shortage of physical resources will occur, and the physical resource quantity shortage when the physical resource shortage occurred. When physical resources corresponding to the amount of PM resources that need to be added for resource optimization have been added to the computer system by the user, the VM arrangement scheduling program 148 can resume the VM load-distribution arrangement scheduling process (Step F108).

When the loop A first-stage optimization processing (Steps F103 through F105) has been performed for all the time segments targeted, that is, when the SegNo variable transitions to SegMax, the VM arrangement scheduling program 148 exits the loop A, executes a time-segment VM arrangement schedule calculation process (refer to FIG. 14), which is the second-stage optimization process, and ends the processing. When the time-segment VM arrangement schedule calculation process is executed, the VM arrangement to be adopted in each time segment of the schedule period, that is, the VM arrangement schedule is registered in the arrangement schedule management table 146.

Thereafter, the VM management server control program 150 refers to the arrangement schedule management table 146, and controls the VM management server 200 so that the registered VM arrangements are carried out in each time segment. This makes it possible to execute VM migration so that the optimum VM arrangement is achieved in each time segment.

Figure 11:
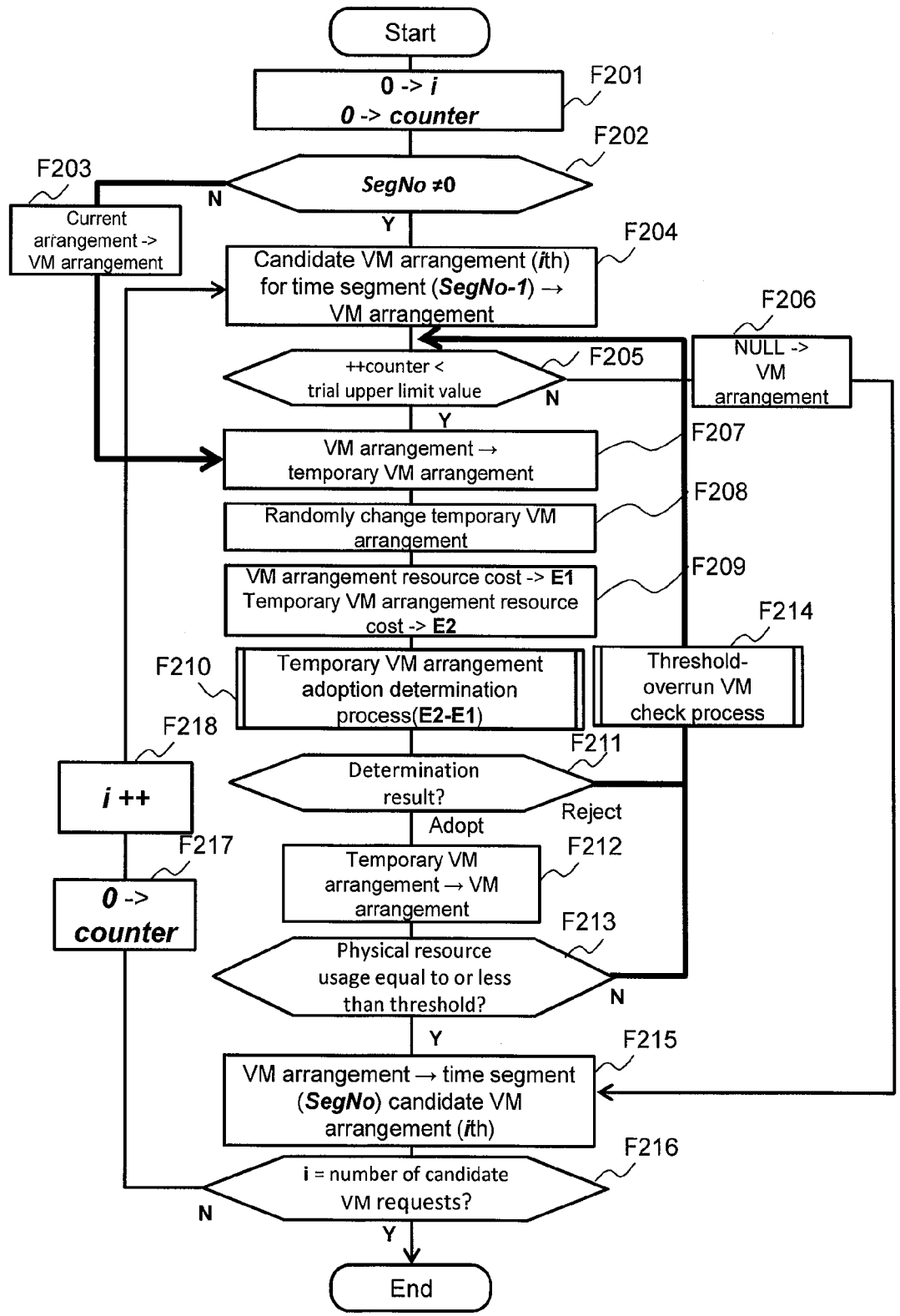
FIG. 11 is a flowchart of processing for retrieving a candidate VM arrangement group related to the embodiment.

FIG. 11 is a flowchart of processing for retrieving a candidate VM arrangement group.

The candidate VM arrangement group retrieval process corresponds to Step F103 of FIG. 10, and the time segment number (SegNo) is passed to this process as an argument.

The VM arrangement scheduling program 148 configures 0 in the i variable, and configures 0 in the counter variable (Step F201).

Next, the VM arrangement scheduling program 148 determines whether the SegNo is not 0 (Step F202).

A case in which the result is that the SegNo is 0 (Step F202: N) signifies that the first time segment in the schedule period is the processing target, making it highly likely that a VM arrangement change will be carried out for the arrangement of the VMs at the current time point. As such, the VM arrangement scheduling program 148 configures the VM arrangement of the current time point to a VM arrangement variable (Step F203), and advances the processing to Step F207. Thus, changing the VM arrangement for the first time segment can be considered having the VM arrangement at the current time point as the criterion.

Alternatively, a case in which the SegNo is not 0 (Step F202: Y) signifies that a time segment other than the first time segment in the schedule period is the processing target, and as such, the VM arrangement scheduling program 148 stores in the VM arrangement variable the value of the VM arrangement pattern 145d corresponding to the $i^{th}$ candidate VM arrangement within the candidate VM arrangement group that corresponds to the one previous time segment, that is, the time segment for which the time-segment identification number is SegNo-1 (Step F204). This makes it possible to consider changing the VM arrangement for the time segment having the VM arrangement of the one previous time segment as the criterion. When the value of the VM arrangement pattern 145d corresponding to the $i^{th}$ candidate VM arrangement within the candidate VM arrangement group is NULL, the value of the VM arrangement pattern 145d corresponding to the candidate VM arrangement of another sequence is stored in the VM arrangement variable.

Next, the VM arrangement scheduling program 148 determines whether or not the incremented counter variable is smaller than a pre-configured trial upper limit value (Step F205).

A case in which the result is that the incremented counter variable is not smaller than the pre-configured trial upper limit value (Step F205: N) signifies that the number of trials to determine whether or not a temporary VM arrangement could be selected as the VM arrangement has already reached to the trial upper limit value, the VM arrangement scheduling program 148 configures NULL in the VM arrangement variable (Step F206) and advances the processing to Step F215.

Alternatively, when the incremented counter variable is smaller than the pre-configured trial upper limit value (Step F205: Y), the VM arrangement scheduling program 148 configures the value of the VM arrangement variable in the temporary VM arrangement variable (Step F207). Thus, in Step F205, in a case where a candidate VM arrangement has not been selected in accordance with comparing the i variable to the trial upper limit value, an attempt can be made to determine whether or not a temporary VM arrangement proportional to the trial upper limit value number obtained from one VM arrangement can be selected as the candidate VM arrangement.

Next, the VM arrangement scheduling program 148 randomly changes the arrangement of the VMs in the temporary VM arrangement variable (Step F208). For example, the VM arrangement scheduling program 148 changes the arrangement of the VMs in accordance with the processing shown in (1) through (5).

(1) The VM arrangement scheduling program 148 randomly selects one VM from among the temporary VM arrangement variables.

(2) The VM arrangement scheduling program 148 randomly selects a PM (PM1 in this case) to serve as the operation destination of the selected VM (VM1 in this case).

(3) The VM arrangement scheduling program 148 returns to (2) when PM1 is the same as the pre-change operation-destination PM of VM1, and advances the processing to (4) when PM1 differs from the pre-change operation-destination PM of VM1.

(4) The VM arrangement scheduling program 148 randomly selects a VM (VM2 in this case) to operate on PM1.

(5) The VM arrangement scheduling program 148 swaps VM1 with VM2, and changes the operation-destination PMs thereof.

Next, the VM arrangement scheduling program 148 calculates the VM arrangement resource cost (first resource cost) corresponding to the VM arrangement variable, configures the first resource cost in an E1 variable, calculates the VM arrangement resource cost (second resource cost) corresponding to the temporary VM arrangement variable, and configures the second resource cost in an E2 variable.

The resource cost will be explained here. The resource cost is a quantitative value showing the degree of difficulty involved for PM 300 resource usage to exceed the resource threshold in a VM arrangement, and in the embodiment, when the resource cost is low, the VM arrangement is evaluated as being more suitable for optimization.

In the embodiment, the resource cost E is defined as follows.

In this case, a PM group of N units ($A^1$ through $A^N$) exists in the computer system, a case in which optimization is performed only for the RAM resource use of each PM 300 is supposed, and when the RAM resource usage of each $PMA^i$ at a time point $t$ is regarded as $r^i_t$, the threshold of the RAM resource usage of each $PMA^i$ is regarded as $T^i_H$, and the length of the time segment is regarded as $\tau$, the overall resource cost E for the PM group can be defined as shown in the following equation (1).

[Formula 1]

$$E = \sum_{i=1}^{N} \sum_{t=1}^{\tau} (T^i_H - r^j_t)^2 \qquad (1)$$

Next, the VM arrangement scheduling program 148 executes a temporary VM arrangement adoption determination process (refer to FIG. 12) (Step F210). The argument in the temporary VM arrangement adoption determination process here is (E2−E1). In the temporary VM arrangement adoption determination process, a determination is made as to whether or not to adopt a temporary VM arrangement as the most suitable VM arrangement. In the temporary VM arrangement adoption determination process, using the Markov chain Monte Carlo method algorithm as reference, a determination is readily made to adopt a temporary VM arrangement for which the resource cost is low, and a determination is not readily made to adopt a temporary VM arrangement for which the resource cost is high.

Next, the VM arrangement scheduling program 148 determines whether or not the determination result for the temporary VM arrangement in accordance with the temporary VM arrangement adoption determination process is adoption (Step F211).

When the result is that the determination result is adoption (Step F211: adopt), the VM arrangement scheduling program 148 configures the value of the temporary VM arrangement variable in the VM arrangement variable (Step F212), and determines whether or not the physical resource usage in the VM arrangement of the VM arrangement variable is equal to or less than the resource threshold of each PM 300 (Step F213).

When the result is that the physical resource usage in any of the PMs 300 in the VM arrangement of the VM arrangement variable is not equal to or less than the threshold (Step F213: N), the VM arrangement scheduling program 148 executes a threshold-overrun VM check process (refer to FIG. 13) (Step F214). In the threshold-overrun VM check process, the VM that caused the threshold overrun is identified in the VM arrangement in which the extent of the threshold overrun is the lowest of the VM arrangements that exceeded the threshold. The VM arrangement scheduling program 148, after executing the threshold-overrun VM check process, moves the processing to Step F205.

Alternatively, when the physical resource usage in all of the PMs 300 in the VM arrangement of the VM arrangement variable is equal to or less than the threshold (Step F213:Y), the VM arrangement scheduling program 148 stores the value of the VM arrangement variable in the target time segment of the candidate VM arrangement management table 145, that is, in the VM arrangement pattern 145d of the $i^{th}$ candidate VM arrangement entry from among the candidate VM arrangement group entries corresponding to the time segment for which the time-segment identification number is SegNo (Step F215).

Next, the VM arrangement scheduling program 148 determines whether or not the i variable is the same as the number of candidate VM arrangements requested by the user (number of candidate VM requests) (Step F216). The number of candidate VM requests is configured in the load balance apparatus 100 beforehand by the user.

A case in which the result is that the i variable is the same as the number of candidate VM requests (Step 216:Y) signifies that the required number of candidate VM arrangements has been obtained, and as such, the VM arrangement scheduling program 148 ends the processing. Thus, in Step F216, since processing is performed until the i variable is the same as the number of candidate VM requests, an attempt is made to select candidate VM arrangements equivalent to the number of candidate VM requests.

Alternatively, a case in which the i variable is not the same as the number of candidate VM requests (Step F216: N) signifies that the required number of candidate VM arrangements has not yet been obtained, and the VM arrangement scheduling program 148 configures 0 in the counter variable (Step F217), increments the i variable (Step F218), moves the processing to Step F204, and performs processing that attempts to select the next candidate VM arrangement.

According to the candidate VM arrangement group retrieval process, at most, candidate VM arrangements equivalent to the number of candidate VM requests are selected for each time segment and stored in the candidate VM arrangement management table 145.

Figure 12:
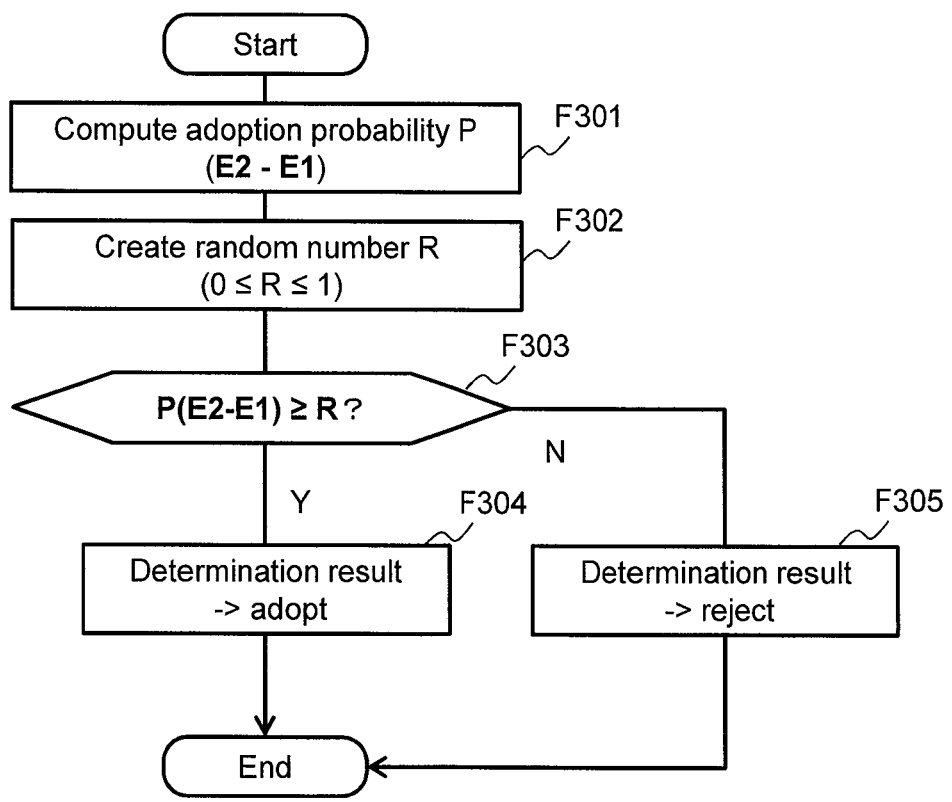
FIG. 12 is a flowchart of determination processing for adopting a VM provisional arrangement related to the embodiment.

FIG. 12 is a flowchart of the temporary VM arrangement adoption determination process related to the embodiment.

The temporary VM arrangement adoption determination process corresponds to Step F210 of FIG. 11, and E2−E1 is passed to this process as the argument.

First, the VM arrangement scheduling program 148 computes an adoption probability P (E2−E1) (Step F301). As used here, the adoption probability P (E2−E1) is the probability that the temporary VM arrangement will be adopted as the most suitable VM arrangement. The algorithm that utilizes the adoption probability P uses the metropolis method as reference. In the embodiment, a determination is made on the basis of a probability to either adopt or reject a temporary VM arrangement using the difference (E2−E1) between the resource costs of the respective temporary VM arrangements and the VM arrangement. The adoption probability P (E2−E1), for example, is expressed as equation (2).

$$P(E2-E1)=e^{-\beta(E2-E1)} \quad (2)$$

As used here, β is the prescribed parameter when performing cost evaluation.

Next, the VM arrangement scheduling program 148 creates a random number R (0≤R≤1) (Step F302), and determines whether or not P(E2−E1) is equal to or larger than the random number R (Step F303).

When the result is that the P(E2−E1) is equal to or larger than the random number R (Step F303:Y), the VM arrangement scheduling program 148 adopts the determination result for the temporary VM arrangement (Step F304), and alternatively, when the result is that the P(E2−E1) is not equal to or larger than the random number R (Step F303: N), the VM arrangement scheduling program 148 rejects the determination result for the temporary VM arrangement (Step F305).

According to the temporary VM arrangement adoption determination process, a determination is readily made to adopt a temporary VM arrangement for which the resource cost is low, and a determination is not readily made to adopt a temporary VM arrangement for which the resource cost is high.

Figure 13:
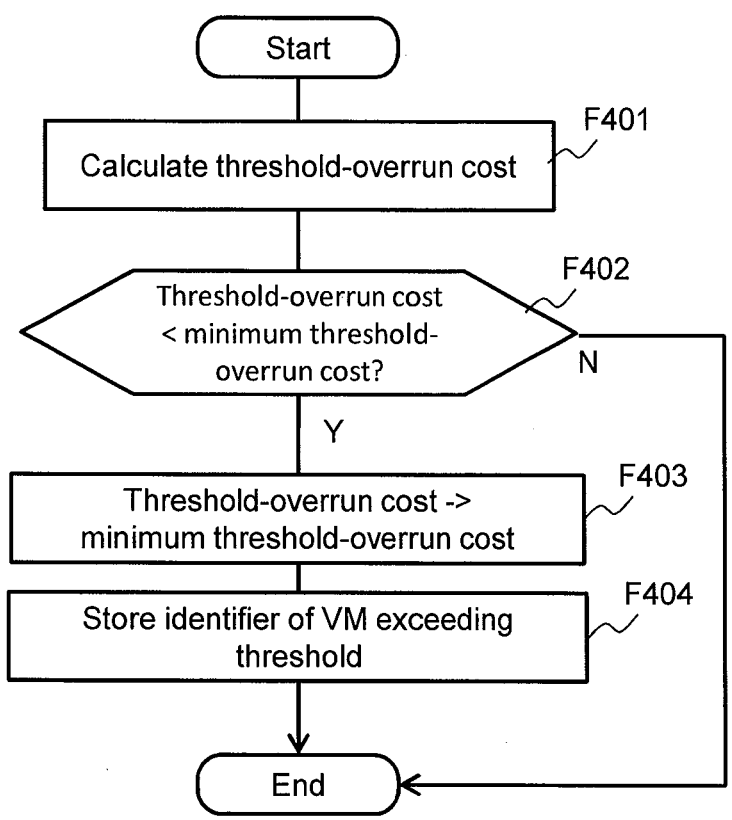
FIG. 13 is a flowchart of processing for checking for a threshold-overrun VM related to the embodiment.

FIG. 13 is a flowchart of the threshold-overrun VM check process related to the embodiment.

The threshold-overrun VM check process corresponds to Step F214 of FIG. 11.

First, the VM arrangement scheduling program 148 calculates a threshold-overrun cost corresponding to the temporary VM arrangement (Step F401).

As used here, the threshold-overrun cost is an evaluation value for quantitatively evaluating the degree to which the threshold has been exceeded for a temporary VM arrangement. A smaller threshold-overrun cost value indicates that the degree to which the resource usage in the PM 300 has exceeded the resource threshold is low.

In this case, a PM group of N units ($A^1$ through $A^N$) exists in the computer system, a case in which optimization is performed only for the RAM resource usage of each PM 300 is supposed, and when the RAM resource usage of each $PMA^i$ at a time point $t$ is regarded as $r^i_t$, the threshold of the RAM resource usage of each $PMA^i$ is regarded as $T^i_H$, and the length of the time segment is regarded as τ, the overall threshold-overrun cost E for the PM group can be defined as shown in the following equation (3).

[Formula 2]

$$E = \sum_{i=1}^{N} \sum_{t=1}^{\tau} (T^i_H - q^i_t)^2 \quad (3)$$

$$q^i_t = \begin{cases} r^i_t & (r^i_t > T^i_H) \\ T^i_H & (r^i_t \leq T^i_H) \end{cases}$$

The threshold-overrun cost E indicated by equation (3) is the total of the square of the difference when the resource usage $r^i_t$ in all of the time segments exceeds the threshold $T^i_H$, and the more the resource usage exceeds the threshold, the larger the value. Therefore, a smaller threshold-overrun cost E value indicates that the degree to which the resource usage in the PM 300 has exceeded the resource threshold is low.

Next, the VM arrangement scheduling program 148 determines whether or not the calculated threshold-overrun cost is smaller than the minimum threshold-overrun cost (Step F402). The initial value of the minimum threshold-overrun cost here is configured to the largest value, and thereafter transitions to the value that was configured in a previously executed Step F403.

A case in which the result is that the calculated threshold-overrun cost is smaller than the minimum threshold-overrun cost (Step F402:Y) signifies that the threshold-overrun cost of the temporary VM arrangement is the smallest of the temporary VM arrangements that had been targeted in this processing, and as such, the VM arrangement scheduling program 148 configures the threshold-overrun cost in the minimum threshold-overrun cost (Step F403).

Nest, the VM arrangement scheduling program 148 identifies the VM identifier of one or more VMs that caused the threshold overrun (threshold-overrun VM), associates the one or more VM identifiers with the identification number of the time segment in which the threshold overrun occurred, and stores the VM identifier in the threshold-overrun VM management table 147 (Step F404). When a record corresponding to the same time segment identification number is already stored in the threshold-overrun VM management table 147, the VM arrangement scheduling program 148 updates the record.

Methods for identifying the VM identifier of one or more threshold-overrun VMs that caused the threshold overrun, for example, include the following method.

(1) Acquire the identifiers of the one or more VMs (VM group) operating on the PM 300 that caused the resource threshold overrun.

(2) Remove from the VM group the one VM for which the resource usage is the smallest, and calculate the resource usage of the PM 300 when the VM has been evacuated from the PM.

(3) Repeat the processing of (2) until the calculated resource usage no longer exceeds the resource threshold. Then, when the calculated resource usage no longer exceeds the resource threshold, identify the identifier(s) of the VM(s) that had been evacuated from the VM group up to this point as the identifier(s) of the threshold-overrun VM(s).

Alternatively, when the calculated threshold-overrun cost is not smaller than the minimum threshold-overrun cost (Step F402: N), the threshold-overrun cost of the temporary VM arrangement is not the smallest of the temporary VM arrangements targeted for the processing, and as such, the VM arrangement scheduling program 148 ends the processing.

According to the processing, the identifier of one or more VMs that caused a threshold overrun is stored in the threshold-overrun VM management table 147 in a case where the threshold-overrun cost was the smallest of the temporary VM arrangements that exceeded the threshold. Therefore, it is possible to identify the minimum (or close thereto) amount of resources required to prevent threshold overrun.

Figure 14:
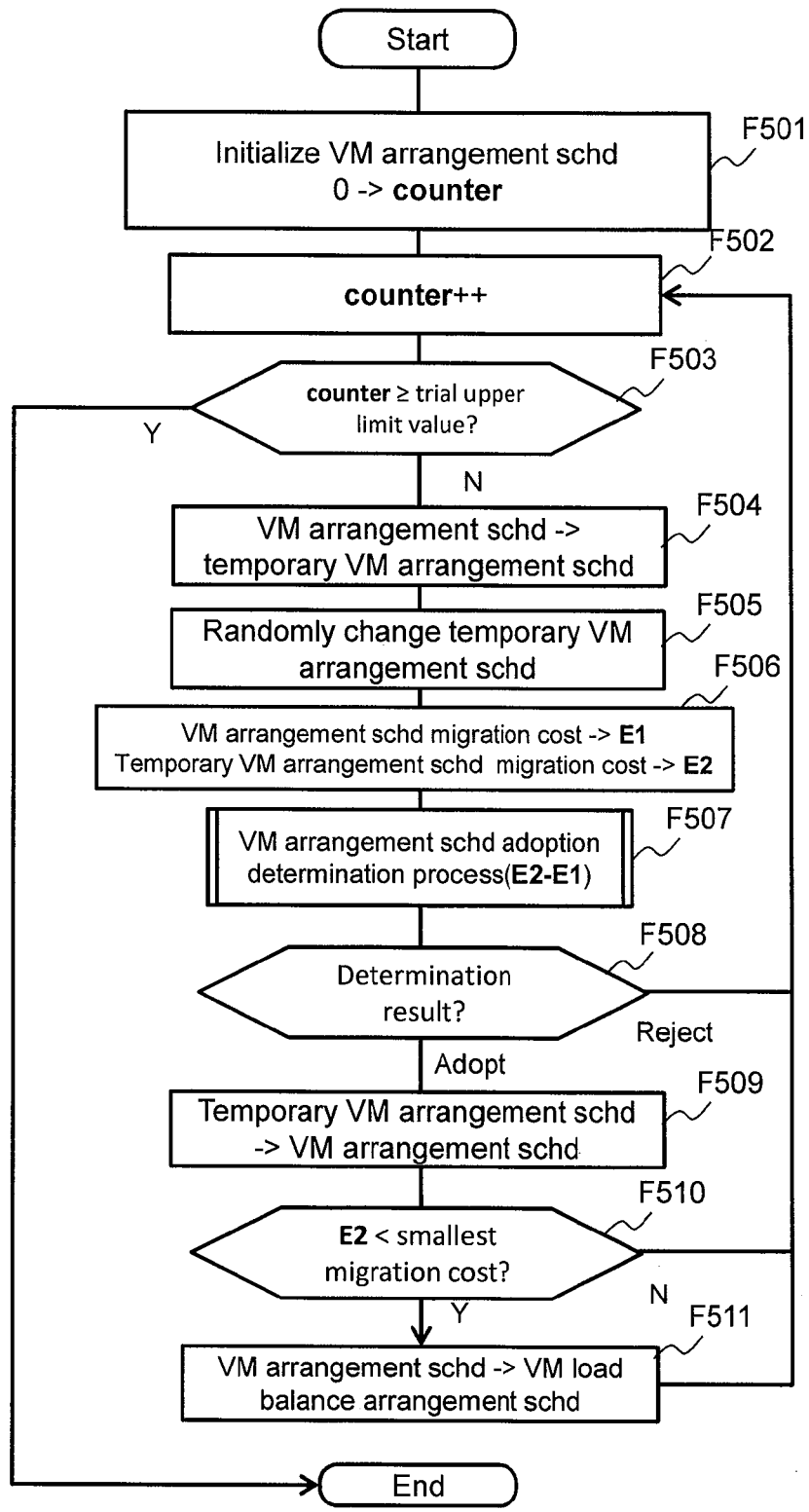
FIG. 14 is a flowchart of processing for calculating a time-segment VM arrangement schedule related to the embodiment.

FIG. 14 is a flowchart of a time-segment VM arrangement schedule calculation process.

The time-segment VM arrangement schedule calculation process corresponds to Step F109 of FIG. 10.

The VM arrangement scheduling program 148 initializes the VM arrangement schedule (schd), and configures 0 in the counter variable (Step F501). As used here, the VM arrangement schedule is a combination of the candidate VM arrangements of each time segment in the schedule period. Initialization, for example, may be an operation that combines the first candidate VM arrangements of each time segment.

Next, the VM arrangement scheduling program 148 increments the counter variable (Step F502).

Next, the VM arrangement scheduling program 148 determines whether or not the counter variable is equal to or larger than a pre-configured trial upper limit value (Step F503).

When the result is that the counter variable is not equal to or larger than the pre-configured trial upper limit value (Step F503: N), the VM arrangement scheduling program 148 configures the value of the VM arrangement schedule in a temporary VM arrangement schedule (Step F504). Thus, in Step F503, it is possible to perform processing until the processing target has been reached for VM arrangement schedules proportional to the trial upper limit value number by comparing the counter variable to the trial upper limit value.

Next, the VM arrangement scheduling program 148 randomly changes the VM arrangement(s) of one or more time segments in a VM arrangement schedule variable (Step F505).

Next, the VM arrangement scheduling program 148 calculates the migration cost corresponding to the VM arrangement schedule variable, configures same in the E1 variable, calculates the migration costs corresponding to the temporary VM arrangement schedule variable, and configures same in the E2 variable (Step F506).

As used here, the migration cost is a quantitative value showing the cost required to migrate VMs in order to realize a VM arrangement schedule, and in the embodiment, when the migration cost is low, the VM arrangement schedule is evaluated as being more suitable for optimization. In the embodiment, the migration cost E is regarded as the number of VMs to be migrated in order to realize the VM arrangement schedule.

Next, the VM arrangement scheduling program 148 executes the VM arrangement schedule adoption determination process (refer to FIG. 15) (Step F507). The argument for the VM arrangement schedule adoption determination process here is (E2−E1). In the VM arrangement schedule adoption determination process, a determination is made as to whether or not a temporary VM arrangement schedule is to be adopted as the most suitable VM arrangement schedule. In the VM arrangement schedule adoption determination process, an algorithm of the Markov chain Monte Carlo method is referenced, and a determination is readily made to adopt a temporary VM arrangement schedule for which the migration cost is low, and a determination is not readily made to adopt a temporary VM arrangement schedule for which the migration cost is high.

Next, the VM arrangement scheduling program 148 determines whether or not the determination result for the temporary VM arrangement schedule in accordance with the VM arrangement schedule adoption determination process is adoption (Step F508).

When the result is that the determination result is adoption (Step F508: adopt), the VM arrangement scheduling program 148 configures the value of a temporary VM arrangement schedule variable in the VM arrangement schedule variable (Step F509), and determines whether or not the migration cost E of the temporary VM arrangement schedule variable is smaller than the minimum migration cost (Step F510). The initial value of the minimum migration cost is configured to the largest value here, and thereafter, transitions to the value configured in a previous Step F511.

When the result is that the migration cost E2 of the temporary VM arrangement schedule variable is not smaller than the minimum migration cost (Step F510: N), the VM arrangement scheduling program 148 moves the processing to Step F502.

Alternatively, when the migration cost E2 of the temporary VM arrangement schedule variable is smaller than the minimum migration cost (Step F510: Y), the VM arrangement scheduling program 148 configures the migration cost E2 of the temporary VM arrangement schedule variable as the new minimum migration cost, reflects the value of the temporary VM arrangement schedule (VM arrangement schedule) in the VM arrangement schedule management table 147 (Step F511), and moves the processing to Step F502.

Alternatively, in Step F503, a case in which the counter variable is equal to or larger than the pre-configured trial upper limit value (Step F503: Y) signifies that processing has been targeted at temporary VM arrangement schedules proportional to the trial upper limit value number, and as such, the VM arrangement scheduling program 148 ends the processing.

According to the time-segment VM load balance arrangement scheduling process, the optimum VM arrangement schedule is stored in the VM arrangement schedule management table 147.

Figure 15:
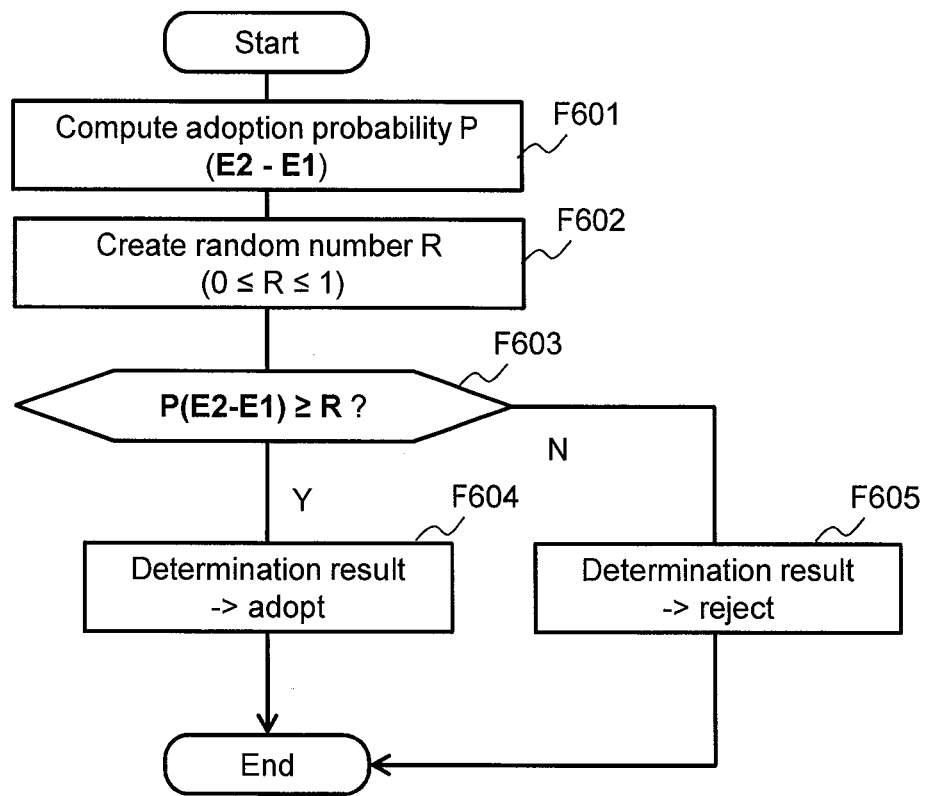
FIG. 15 is a flowchart of determination processing for adopting a VM arrangement schedule related to the embodiment.

FIG. 15 is a flowchart of the VM arrangement schedule adoption determination process.

The VM arrangement schedule adoption determination process corresponds to Step F507 of FIG. 14, and E2−E1 are passed to this processing as the argument.

First, the VM arrangement scheduling program 148 computes the adoption probability P(E2−E1) (Step F601). As used here, the adoption probability P(E2−E1) is the probability that the temporary VM arrangement schedule will be adopted as the most suitable VM arrangement schedule. The algorithm that utilizes the adoption probability P uses the metropolis method as reference. In the embodiment, a determination is made on the basis of a probability to either adopt or reject a temporary VM arrangement schedule using the difference (E2−E1) between the VM arrangement schedule and the migration costs of the respective temporary VM arrangement schedules. The adoption probability P(E2−E1), for example, is expressed as equation (4).

$$P(E2-E1)=e^{-\beta(E2-E1)} \quad (4)$$

As used here, β is the prescribed parameter when performing cost evaluation.

Next, the VM arrangement scheduling program 148 creates a random number R (0≤R≤1) (Step F602), and determines whether or not P(E2−E1) is equal to or larger than the random number R (Step F603).

When the result is that the P(E2−E1) is equal to or larger than the random number R (Step F603: Y), the VM arrangement scheduling program 148 adopts the determination result for the temporary VM arrangement schedule (Step F604), and alternatively, when the result is that the P(E2−E1) is not equal to or larger than the random number R (Step F603: N), the VM arrangement scheduling program 148 rejects the determination result for the temporary VM arrangement schedule (Step F605).

According to the temporary VM arrangement schedule adoption determination process, a determination is readily made to adopt a temporary VM arrangement schedule for which the migration cost is low, and a determination is not readily made to adopt a temporary VM arrangement schedule for which the migration cost is high.

Figure 16:
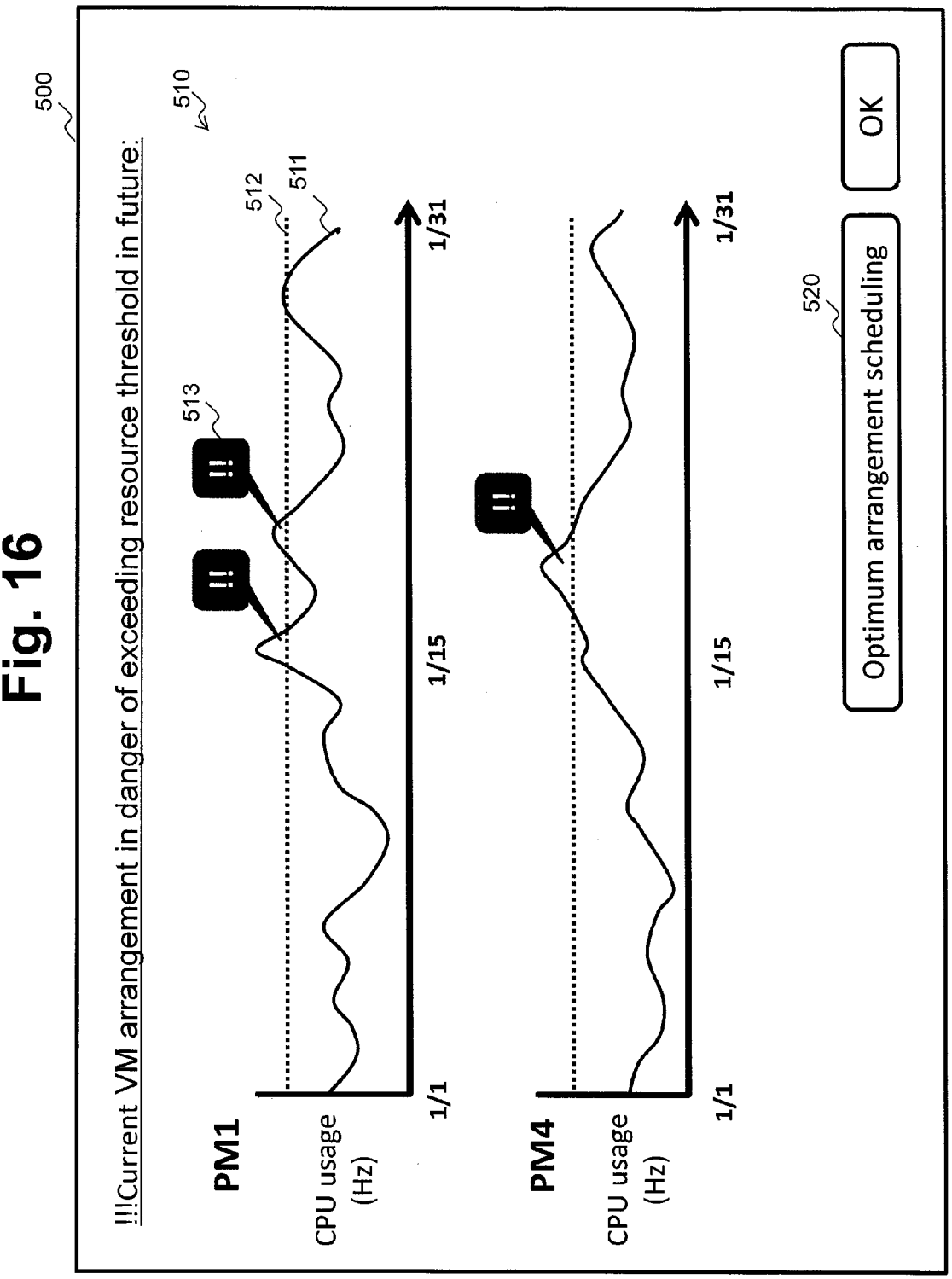
FIG. 16 is a block diagram of a resource prediction display screen related to the embodiment.

FIG. 16 is a block diagram of a resource prediction display screen.

The resource prediction display screen 500 is for displaying a prediction for physical resource usage during the schedule period and receiving an instruction from the user to start an optimum arrangement scheduling process, and is displayed on the input/output device 120 by the VM arrangement scheduling program 148. The resource prediction display screen 500 includes prediction display areas 510 for displaying a physical resource usage prediction for each PM 300, and an optimum arrangement scheduling button 520 for accepting the start of the optimum arrangement scheduling process. In a prediction display area 510, a line 511 indicating the predicted physical resource usage for each PM 300 is displayed in chronological order, and, in addition, a line 512 indicating the physical resource threshold of the PM 300 is also displayed. In addition, a caution symbol 513 is displayed in the prediction display area 510 at a location where the resource predicted usage exceeds the resource threshold. The VM load balance arrangement scheduling process shown in FIG. 10 is started when the optimum arrangement scheduling button 520 is pressed.

FIG. 17 is a block diagram of a post-optimum arrangement scheduling resource prediction display screen.

The post-optimum arrangement scheduling resource prediction display screen 600 is for displaying a prediction for physical resource usage during the schedule period when implementing a VM arrangement schedule decided in accordance with the VM load balance arrangement scheduling process and for receiving an instruction from the user to adopt the VM arrangement schedule, and is displayed on the input/output device 120 by the VM arrangement scheduling program 148.

The post-optimum arrangement scheduling resource prediction display screen 600 includes prediction display areas 610 for displaying predictions of physical resource usage assumed in a case where the VM arrangement schedule obtained by executing the VM load balance arrangement scheduling process has been adopted, and a schedule adoption button 620 for receiving an instruction for adopting the VM arrangement schedule decided in accordance with the VM load balance arrangement scheduling process. For the physical resource usage prediction for each PM in the prediction display area 610, the VM arrangement number of the VM arrangement to be adopted at each time segment in the schedule period can be identified by referring to the arrangement schedule management table 146, and on the basis of the VM arrangement number, a VM arrangement pattern can be identified from the candidate VM arrangement management table 145, and the VM arrangement pattern can be identified by referring to the VM management table 142 and the VM resource use management table 144.

When the schedule adoption button 620 is pressed, the VM management server control program 150 refers to the arrangement schedule management table 146, and controls the VM management server such that the registered VM arrangement is carried out in each time segment.

The effects of the embodiment will be explained in detail here.

For example, when it is assumed that the VM resource usage will change suddenly, the expectation is that even though the VMs have been arranged using a conventional method so as to keep PM resource usage equal to or less than the threshold, the threshold for PM resource usage will frequently be exceeded when VM resource usage changes thereafter, and the rearrangement of the VMs will be generated repeatedly in order to hold PM resource usage down to equal to or less than the threshold. In this case, in addition to not being able to prevent PM threshold overrun, the high frequency of VM rearrangements cause VM migration costs to become extremely high and makes stable operation of the VM impossible to realize.

By contrast, according to the computer system related to the embodiment, PM resource usage threshold overrun can be appropriately reduced, and, in addition, a schedule that enables VM arrangement to be carried out at a relatively low migration cost can be identified in a relatively short period of time.

In the computer system related to the embodiment, it is possible to efficiently identify a VM arrangement schedule that (1) enables the PM resource usage to be held down to equal to or less than the threshold during the schedule period, and (2) enables VM migration costs to be lowered.

For example, when the algorithm for identifying this kind of VM arrangement schedule is realized using an ordinary one-stage optimization algorithm, there are cases in which retrieval costs become extremely high, and retrieval within a realistic period of time becomes difficult.

A specific example that assumes a computer system running 100 VMs on 30 PMs, sets the schedule period for 10 days, from January 1 through January 10, and makes the length of the time segment one day will be considered here.

In the specific example, in a case where a schedule that achieves both (1) and (2) is retrieved using an ordinary one-stage optimization algorithm, the number of VM arrangement schedules (size of the search space) capable of being handled in the computer system is somewhere around $(30^{100})^{10}$ to $10^{1470}$, and retrieving the optimum schedule would required an enormous amount of time.

By contrast, in the computer system related to the embodiment, first-stage processing searches for a plurality of candidate VM arrangements that will become appropriate candidates for VM arrangements in each time segment of the schedule period, and second-stage processing retrieves an appropriate schedule from among schedules that combine a plurality of candidate VM arrangements. Therefore, in the specific example described above, when the number of candidate VM arrangements searched in the first-stage processing is 1000, the size of the search space manipulated in first-stage and second-stage processing is around $30^{100} \times 1000 \times 10 + 1000^{10}$ to $10^{151}$, and winds up being much smaller than the conventional number. Therefore, in the computer system related to the embodiment, it is possible to retrieve an appropriate schedule in a shorter period of time than in the past.

An embodiment has been explained hereinabove, but needless to say, the present invention is not limited to this embodiment, and various changes are possible within the scope of the present invention without departing from the gist thereof.

For example, the physical machine is not limited to a computer, and may be another type of machine such as a storage apparatus.

Also, for example, in the above-described embodiment, VM arrangements were given as examples of arrangements of logical structures in the explanation, but the present invention is not limited to this, and may be applied to the arrangement of other types of logical structures, such as, for example, virtual storage apparatuses, virtual logical volumes that conform to thin provisioning, pages allocated to a virtual logical volume that conforms to thin provisioning, logical volumes, logical partitions (LPAR), web servers, and virtual domains.

In addition, in the above-described embodiment, an optimum VM arrangement schedule for a schedule period is decided beforehand and VM arrangements are carried out in accordance with the schedule, but after the schedule period has started, for example, in prescribed cases (for example, a case in which the actual usage of the physical resource differs greatly from a predicted value), on the basis of the actual resource usage up until that point, the same processing as the VM load balance arrangement scheduling process may be carried out for at least a portion of the time segments subsequent thereto, an appropriate VM arrangement schedule may be retrieved, and the VM arrangement schedule may be adopted.

In the above-described embodiment, the migration cost E was regarded as the number of VM migrations, but the present invention is not limited to this, and, for example, the migration cost E may be expressed using the equation (5) below.

$$E = \alpha E_1 + (1-\alpha) E_2 \quad (5)$$

As used here, α is a prescribed constant of equal to or less than 1. $E_1$ is a value based on the resource cost for a target VM arrangement schedule, and is $0 < E_1 < 1$. In addition, $E_2$ is a value based on the number of VM migrations for realizing the target VM arrangement schedule, and is $0 < E_2 < 1$. Using the migration cost E makes it possible to appropriately select a VM arrangement schedule having the smallest possible resource cost while reducing the number of VMs that are migrated.

REFERENCE SIGNS LIST

100 Load balance apparatus
200 VM management server
300 Physical machine (PM)

The invention claimed is:

1. A load balance apparatus for controlling an arrangement of a plurality of logical structures that use resources of a plurality of physical machines,
   the load balance apparatus comprising:
   a storage resource storing historical data representing a history of resource usage by a logical structure, and a criterion value for each of the plurality of physical machines; and
   a processor coupled to the storage resource,
   wherein the criterion value for one single physical machine is a threshold for resource usage for the physical machine, and
   wherein the processor is configured to:
   (A) predict, on the basis of the historical data, time-series variations in resource usage for each arrangement control-targeted logical structure for a schedule period, which is a period in the future;
   (B) attempt to select a plurality of arrangement candidates for which resource usage is equal to or less than the criterion value in each of the plurality of physical machines for each of a plurality of time segments comprising the schedule period;
   (C) compute, for each of a plurality of holistic arrangement plans, a migration cost for migrating the logical structures between the physical machines to implement an arrangement according to a holistic arrangement plan, each of the plurality of holistic arrangement plans being a combination of a plurality of selected arrangement candidates corresponding to each of the plurality of time segments, and a selected arrangement candidate for one time segment being one arrangement candidate from among a plurality of arrangement candidates corresponding to the time segment; and
   (D) select one holistic arrangement plan from the plurality of holistic arrangement plans based on the migration cost of each of the plurality of holistic arrangement plans;
   wherein the processor is configured to, in the (B) processing, determine, on the basis of a difference between a first resource cost, which is a value indicating a degree of difficult for resource usage of a first arrangement of logical structures to exceed the criterion value, and a second resource cost, which is a value indicating the degree of difficult for resource usage of a second arrangement of logical structures to exceed the criterion value, for each physical machine of each time segment, whether or not the resource usage of the second arrangement is to be adopted as a target for comparison with the criterion; and wherein the processor is configured to, in the (B), store, in the storage resource, information or identifying a logical structure exhibiting an exceeded criterion value with respect to a second arrangement for which the degree to which the physical resource criterion value has exceeded is the lowest of the plurality of second arrangements that have not been selected as the arrangement candidate.

* * * * *